United States Patent [19]

McVaugh

[11] Patent Number: 5,897,073
[45] Date of Patent: Apr. 27, 1999

[54] REEL HANDLER

[76] Inventor: Arthur K. McVaugh, P. O. Box 800, Green Lane, Pa. 18054

[21] Appl. No.: 08/854,615

[22] Filed: May 12, 1997

Related U.S. Application Data

[63] Continuation-in-part of application No. 08/692,380, Aug. 5, 1996, abandoned.

[51] Int. Cl.[6] ............................ B65H 75/44; B65H 75/48; B65H 75/24
[52] U.S. Cl. .................................... 242/399.1; 242/390.5; 242/578
[58] Field of Search ............................... 242/390.5, 390.6, 242/399.1, 399.2, 403, 578, 592

[56] References Cited

U.S. PATENT DOCUMENTS

| 191,134 | 5/1877 | Gibson et al. | 91/212 |
|---|---|---|---|
| 3,091,413 | 5/1963 | Leithiser | 242/399.1 |
| 3,123,314 | 3/1964 | Bruestle | 242/390.5 |
| 4,155,518 | 5/1979 | Small | 242/390.5 |
| 4,588,142 | 5/1986 | Malzacher | 242/390.5 |

FOREIGN PATENT DOCUMENTS

| 3171 | 12/1864 | United Kingdom | 91/212 |
|---|---|---|---|

Primary Examiner—John Q. Nguyen
Attorney, Agent, or Firm—John S. Munday; Stephen G. Stanton

[57] ABSTRACT

A reel handler including at least one reel arm for engaging a reel is mounted on a frame. A moving device moves the reel arm to raise and lower the engaged reel, and a hydraulic motor for rotating the reel is contained within the end of the reel arm. The hydraulic motor includes a crank shaft operable to rotate the reel when the crank shaft is rotated. Preferably, two spaced reel arms are pivotally mounted on a transverse, telescoping support cylinder that allows the reel arms to be spaced at varying distances to accommodate reels of various sizes. At least two cylinder and piston assemblies are attached to the crank shaft for rotation of the crank shaft upon movement of each piston between a minimum and maximum point of travel in the cylinders. The two cylinders are offset with respect to each other such that each piston reaches its said minimum and maximum points of travel while the other is offset from its own said minimum point of travel. A valve assembly, driven by the crank shaft, provides hydraulic fluid to the cylinders under pressure to sequentially move each piston between its said minimum and maximum points of travel by providing hydraulic fluid under pressure on each piston in the desired direction of piston travel while evacuating hydraulic fluid under lesser pressure from the other side of the piston in its cylinder.

9 Claims, 11 Drawing Sheets

REEL HANDLER

This is a continuation-in-part application of my application Ser. No. 08/692,380 filed Aug. 5, 1996, now abandoned.

FIELD OF THE INVENTION

The present invention relates to a reel handler device having at least one reel arm for engaging reels of various sizes to load and unload the reels from trucks or trailers. A motor within the reel arm rotates the reel to payout and take-up cable from the reel. The motor includes cylinder and piston assemblies in which the pistons are operated upon by hydraulic fluids on both sides of the pistons, so as to provide an optimized compact design with maximized power.

BACKGROUND OF THE INVENTION

Motors that are driven by fluid pressure are not new. Steam engines utilize the expansion of pressurized steam in a cylinder to drive the piston, thereby deriving work energy from the expansion step. Internal combustion engines derive work energy from combustion of fuels in oxygen from the air to drive a piston in a cylinder. In both of these types of motors, the cylinder is subjected to rapid expansion of gasses that push the piston through one step in the power cycle. Depending on the particular type of motor, such as steam, two or four cycle internal combustion or diesel combustion, products are produced that are expelled via exhaust valves and the like.

Hydraulic motors are also used in some instances, where a fluid under pressure is introduced into a cylinder to drive a piston and thus convert hydrostatic energy to movement, usually rotational, by driving a crank shaft and the like. In some cases the hydraulic motor is designed to drive a shaft, usually in combination with a transmission or at gear box.

One form of hydraulic motor that has found use in industry is the low speed/high torque hydraulic motor. These motors have been found to have substantial advantages over systems in which a high speed motor is used in combination with a gear box speed reducer. A significant advantage is that the combination of low speed and high torque provides a large amount of power in a relatively small drive package. Other benefits include low noise and vibration, as well as high energy efficiency. Such low speed and high torque motors are capable of rapid reversal of direction by reversing the direction of hydraulic fluid flow.

These low speed and high torque hydraulic motors come in two basic forms and in a variety of designs. The motors either are gear reduction motors or radial piston motors. In the former, high speed motors are reduced using a complicated series of gears to lower the speed and achieve higher torque. In the latter, various schemes for moving fluids around the axis of a crankshaft have been provided.

Vane motors employ pressure against a plurality of vanes riding on a ring cam to form sealed chambers that carry fluid through the device, optimally at low pressure. The major disadvantage is that there are too many leakage paths. Rolling-vane motors sequence fluid flow to put high pressure against trailing surfaces and low pressure against leading surfaces, but are limited in displacement.

There are also a variety of piston motors. Radial piston motors have a wide displacement range and are very efficient in medium or high displacement ranges. Cam type radial piston motors are less efficient and have difficulty at low speed. Axial piston motors are effective and have good starting torque characteristics. Two sources of heavy duty hydraulic motors are Nutron Motor Co., Inc. in Eliot, Maine, which produces a radial piston hydraulic motor under the MHA series, and Kawasaki Precision Machinery, Inc. which produces radial piston hydraulic motors at its Staffa facility in Plymouth, England.

One of the principle drawbacks to hydraulic motors is that the commercial designs are extremely large for the power that is produced. Both the space or volume taken up by such motors and the weight that is needed are so great as to be seen as drawbacks or handicaps when selection of a motor is being made. In order to have useful torque in industrial applications, such as in heavy equipment, moveable boat and lumber lifts, end loaders, reel drives, winches, and other hub drive designs, great amounts of power is needed. However, all presently known designs are not capable of effectively using the power of a short stroke, high displacement motor arranged within a compact area or motor volume so as to be adapted to the device of interest.

It would be of great advantage if an improved hydraulic motor could be provided that would deliver the same or greater power using less space and having less weight than conventional motors which have been described.

In addition, it would be an advance in the art if high torque, low speed motors could be designed that did not require the use of multiple reducing gears to translate high speed motion into low speed, high torque output.

Further, it would be an advance in the art if a hydraulic motor could be provided that was capable of reversing virtually instantaneously to reverse the movement of any power transmission shaft to which the motor would be attached.

It would be a significant advance if a hydraulic motor could be provided that had the capability of self braking, so that no additional brake device would be needed for the motor, and the equipment to which it is attached, to remain motionless while supporting the full weight of the load being driven. In other words, it would be a great advance if the motor could stop at any pre-selected point and support the load attached thereto without the use of additional brake elements.

Reel handlers for loading and unloading reels from trucks or trailers are not new per se. Some reel handlers allow for powered payout and take-up of cable from the loaded reels by the use of friction rollers contacting the periphery of the reels. Examples are Hall, U.S. Pat. Nos. 3,184,082 and 3,325,118; and Woodruff, U.S. Pat. No. 4,228,967. Skalleberg et al U.S. Pat. No. 5,123,602 discloses a drive for cable reels by the use of frictional contact of the reel periphery with a powered car tire as the roller. However these methods of reel rotation are not precise and braking of the reel by friction contact of the rollers/tires against the reel is less than optimal. Further, powered rotation, and prompt reversal of the rotation, is limited by slippage of the roller at the reel periphery.

It would be an advance in the art if a reel handler could be provided that allowed for precise powered rotation of reels with self-braking features and rapid, almost instantaneous reversal of reel rotation.

McVaugh, U.S. Pat. No. 3,820,673 allows for engagement of reels of varying sizes and permits transfer of one reel to a first location and return for a second reel.

Mechanically complex devices to rotate mounted reels are disclosed in, for example, Berry, III et al., U.S. Pat. Nos. 5,246,180 and 5,333,809. Berry, III et al. require the use of high torque electrical gear motors or motor/gear reducer combinations with drive screw and drive nut arrangements.

Similar complex mechanisms are also used in the Berry, III et al. 5,333,809 portal traverse assembly to substantially vary the width between the spaced masts to engage reels of varying sizes. However these motors are complex and relatively heavy. The motors are also large, bulky and require the use of reducing gears to convert the high speed of the motors to the low speed, high torque necessary for controlled reel rotation.

It would be of great advantage if a reel handler could be provided that used motors and devices of few moving parts to engage and rotate reels of varying sizes and to raise and lower the reel to facilitate loading and unloading of the reels from a chassis and payout and take-up of cable from the reel.

Hirakawa et al., U.S. Pat. No. 4,460,135 discloses a mill roll stand that permits raising and lowering of a paper roll and movement of the movable frames holding the paper roll along a threaded shaft. Again this is a mechanism that can be easily damaged.

It would be a advance in the art if a reel handler could be provided that used rugged motors and devices of relatively few moving parts to minimize damage and breakdown of the reel handler during use.

Other devices have been used to load, unload, and in some cases unroll, round hay bales. For example, see Parker, U.S. Pat. No. 3,946,887; and Hostetler, U.S. Pat. No. 4,044,963. Hostetler allows the round bale to be unrolled by controlled positioning of the bale adjacent the ground surface and rolling the bale thereon upon movement of the vehicle. None of the prior art provides for the use of a compact, high torque/low speed motor that is contained within a reel lift arm.

It would be an advance in the art if an improved reel handler could be provided that incorporated a compact, high torque, low speed hydraulic motor within its supporting reel arm to rotate the reel.

The prior art does not provide a safety mechanism that reliably prevents inadvertent release of the engaged reels. Engagement of the reels is of critical importance during transportation of the reels at high speeds along public roads and highways.

It would be a significant advance in the art if a safety device could be provided that reliably prevented inadvertent release of engaged reels.

Accordingly, it is an object of the present invention to provide a hydraulic motor capable of operating under high torque and low speed, such motor being suitable for operation in a smaller space than prior art designs such as within a reel arm of a reel handler.

A further object of this invention is to provide a hydraulic motor capable of producing high torque and low speed without the need for multiple reducing gears to translate high speed motion into the resultant high torque and low speed to make the motor more reliable during use in, for example, a reel handler.

Another object of this invention is to provide a hydraulic motor which is capable of supporting a load at zero velocity without the need or requirement of an additional brake device to facilitate, for example, precise reel payout and take-up of a reel handler.

Yet another object of the present invention is to provide a hydraulic motor capable of almost instantaneous reversal allowing for a like reversal of any power transmission shaft to which the motor would be attached to facilitate, for example, precise reel payout and take-up of a reel handler.

Another object of the present invention is to provide an improved reel handler with relatively few moving parts to engage and rotate reels of varying sizes and to raise and lower the reel to facilitate loading and unloading of the reels from a chassis, and payout and take-up of cable from the reel.

Yet a further object of the present invention is to provide a simple safety device for a reel handler that reliably prevents inadvertent release of engaged reels.

Other objects will appear hereinafter.

SUMMARY OF THE INVENTION

It has now been discovered that the above and other objects of the present invention may be accomplished in the following manner. Specifically, the present invention provides a hydraulic motor employing dual action on the piston, so as to push as well as pull the piston with a power stroke. Thus the broad concept resides in the use of hydraulic fluid to push and pull a pair of pistons to drive a crank shaft. In the preferred embodiment, there are at least two pistons, offset on the crank shaft some amount, preferably 90°, to insure that one piston is always working when the other passes null (dead top or bottom center of the cycle) from push to pull. The hydraulic lines introduce fluid in one end to push the piston to its maximum position, then fluid is introduced to the other side of the piston as pressure is released on the first side so that the fluid continues to drive the piston to its minimum position with respect to the crank shaft.

The motor includes a housing suitable for mounting on a frame of a vehicle or other device such as a reel handler reel arm. As can be appreciated, the power of a low speed, high torque motor is substantial, and thus the mounting frame must be strong enough to resist the torsion or twisting exerted by the pistons as they travel through the cycles.

The principal components of the motor include a crank shaft mounted in the housing and operably connectable to a drive shaft associated with the frame. Typical uses of the motor of this invention are reel drives, winches, hub drives and wheel motors, tractor motors, and lifting devices such as end loaders and the like.

While the present invention is capable of operating with only one cylinder and piston, it is possible in such a configuration that the motor would stop at dead high or dead low rotation, or, in other words, at the precise point of maximum or minimum piston travel in the cylinder. At that point it would be difficult to initiate movement in either direction. Of course, a fly wheel and starter motor would be suitable to resolve that concern. Thus, it is contemplated within the scope of this invention that means could be provided to move the piston off dead center or, alternatively, prevent it from stopping at dead center, so as to permit the construction of a single piston/cylinder motor within the scope of this invention.

Normally it is preferred to have at least two cylinder and piston assemblies attached to the crank shaft for rotation of the crank shaft upon movement of the pistons between a minimum and maximum point of travel in the cylinders to thereby impart motion to the crank shaft. The two cylinders are offset with respect to each other, preferably by about 90° of rotation of the crankshaft. Of course if six piston and cylinder assemblies are used, the spacing or offset would be that which provides maximum mechanical advantage over the entire cycle of operation. Other combinations are also within the scope of this invention.

A valve means is provided for introducing fluid, particularly hydraulic fluids, to the cylinders under pressure to sequentially move each piston. The valve means is driven by the crank shaft. Hydraulic fluid under pressure is supplied to one face of a piston to move the piston in the desired direction of piston travel. At the same time, the valve means also allows hydraulic fluid to evacuate under lesser pressure from the opposite face of the piston in the cylinder in the other direction of piston travel.

A source of hydraulic fluid under pressure is connected to the valve assembly for supplying hydraulic fluid thereto under pressure and for receiving hydraulic fluid on return under lesser pressure.

Further, the present invention provides an improved reel handler having at least one reel arm mounted on a frame. The reel arm engages the reel and a moving device is connected to the reel arm and moves the reel arm to thereby raise and lower the reel. At least one of the above-described compact, high torque low speed hydraulic motors is contained within the reel arm and is operably connected to an engaging bar to engage the reel and to rotate the reel when the hydraulic motor crank shaft is rotated.

The reel handler preferably includes a second reel arm spaced from the first reel arm for engagement of the reel, where each reel arm engages an axial end of the reel. One hydraulic motor may be contained within each of the spaced reel arms for driving engagement of the reel. The spaced reel arms are pivotally attached to a hydraulic telescoping support cylinder for selective lateral movement of one or both of the reel arms about the same axis as the pivot axis so as to easily and quickly accommodate reels of varying sizes.

A telescoping safety bar may be connected to the reel arms to prevent their separation and thus inadvertent release of the reel, for example during transport of the reel. The safety bar has a one way latching mechanism and includes indicator buttons that project from one side of the bar when hydraulic pressure has released a toothed collet that otherwise prevents telescoping of the bar.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
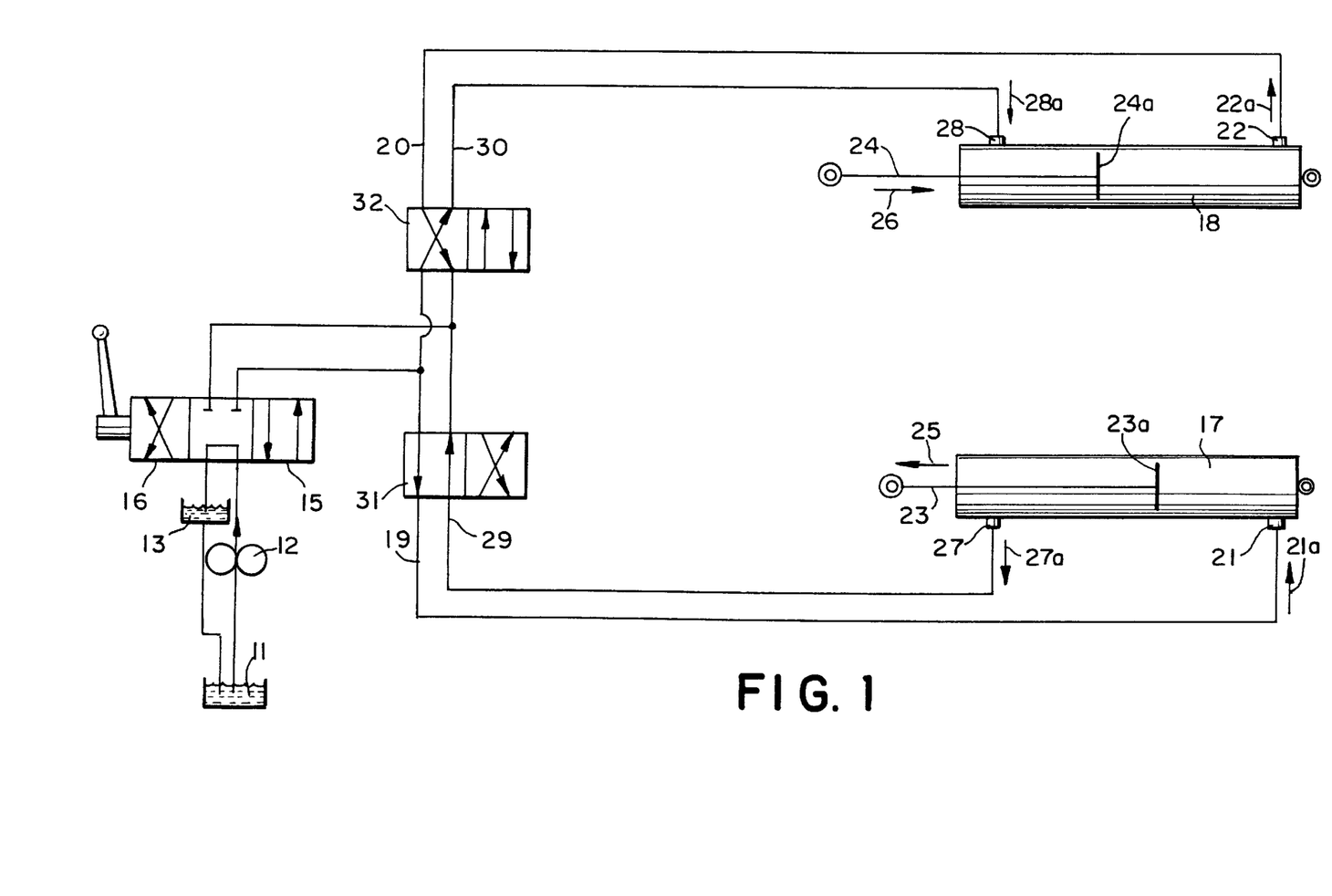
FIG. 1 is a schematic view showing the hydraulic flow system utilized in the device of this invention.

As shown in the drawings, FIGS. 1–7, inclusive, the present invention provides a hydraulic motor employing dual action on a piston, so as to push as well as pull the piston with a power stroke. Shown in FIG. 1 is a schematic flow diagram illustrating the way that fluid flows into a pair of pistons to drive a shaft. The hydraulic lines route fluid in one end to push the piston to maximum position, then fluid is introduced to the other side of the piston as pressure is released on the first side so that the fluid continues to drive the piston to its minimum position with respect to the crank shaft.

Specifically shown in FIG. 1 is a source of hydraulic fluid 11 that is routed under pressure by pump 12. A return chamber 13 functions to receive the return of fluid under reduced or low pressure and return it to source 11. Valve 15 transmits high pressure hydraulic fluid from pump 12 and functions as a forward/reverse control, so that the motor operates to rotate in a first or forward direction of rotation or in a second or reverse direction of rotation.

Valves 31 and 32 serve to direct the high pressure fluid in one direction for the first cylinder 17 and in the opposite direction for second cylinder 18. High pressure hydraulic fluid flows through valve 31 via line 19 into first port 21 of cylinder 17, as shown by the inlet arrow 21a, pushing piston rod 23 in the direction of arrow 25. Hydraulic fluid exits cylinder 17 at second port 27 as shown by the outlet arrow 27a, to be returned via line 29 to return chamber 13 through valve 15. Valve 31 functions to control flow in lines 19 and 29. Fluid entering port 21 forces the piston head 23a on piston rod 23 to move in the direction of arrow 25 until it reaches its maximum point of travel.

At the same time, high pressure hydraulic fluid flows in a second direction via line 30 through valve 32 into second port 28 of cylinder 18, as shown by the inlet arrow 28a, pulling piston rod 24 in the direction of arrow 26. Hydraulic fluid exits cylinder 18 at first port 22 as shown by the outlet arrow 22a, to be returned via line 20 to return chamber 13 through valve 15. Valve 32 functions to control flow in lines 20 and 30. Fluid entering port 28 forces the piston head 24a on piston rod 24 to move in the direction of arrow 26 until it reaches its minimum point of travel.

When valve 31 senses that piston rod 23 has reached its maximum stroke, as will be shown in several embodiments below, flow in lines 19 and 29 is reversed, so that high pressure fluid enters second port 27 in the opposite direction to arrow 27a, forcing the piston head 23a on piston rod 23 to move in the opposite direction to arrow 25. Pressure in line 19 is released by valve 31 so that low pressure fluid exits cylinder 17 via first port 21 in the direction opposite to arrow 21a. Similarly when valve 32 senses that piston rod 24 has reached its minimum stroke, as will be shown in several embodiments below, flow in lines 30 and 20 is reversed, so that high pressure fluid enters first port 22 in the opposite direction to arrow 22a, forcing the piston head 24a on piston rod 24 to move in the opposite direction to arrow 26.

Pressure in line 30 is released by valve 32 so that low pressure fluid exits cylinder 18 via second port 28 in the direction opposite to arrow 28a.

As can be appreciated, both cylinder 17 and cylinder 18 have what is called a null point or dead point when hydraulic pressure is switching from high to low on one side or the other of the piston head 23a, 24a, respectively. For that reason, when two pistons are used, as in FIG. 1 and elsewhere, the piston cycles are offset from each other, preferably by 90° of the crank rotation, so at least one piston is driving in one direction while the other piston is at null as the direction of high pressure flow reverses for that other piston.

Figure 2A:
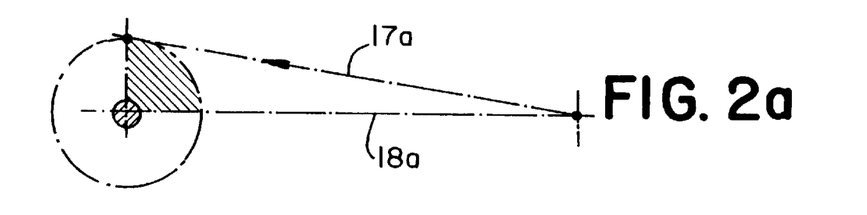
FIGS. 2a, 2b, 2c, 2d, 2e, and 2f are schematic views illustrating a sequence of high and low pressure on both sides of a piston, with three views showing dead center, extending and retracting positions.
Figure 2B:
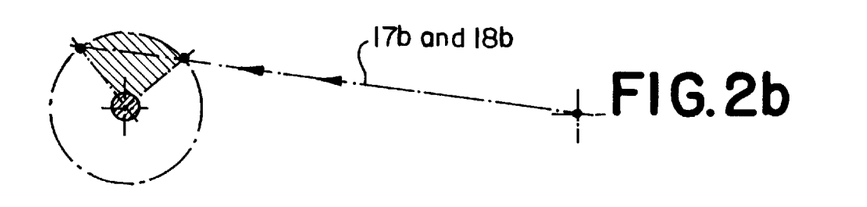
Figure 2C:
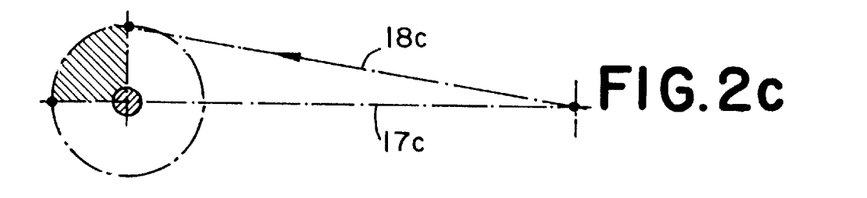
Figure 2D:
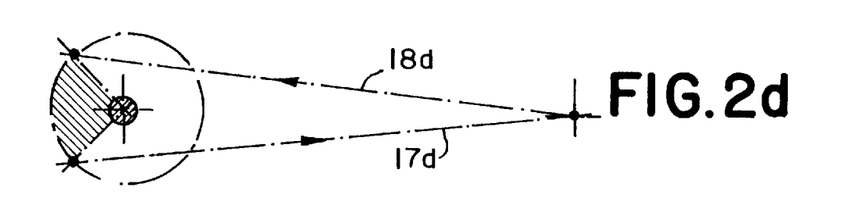
Figure 2E:
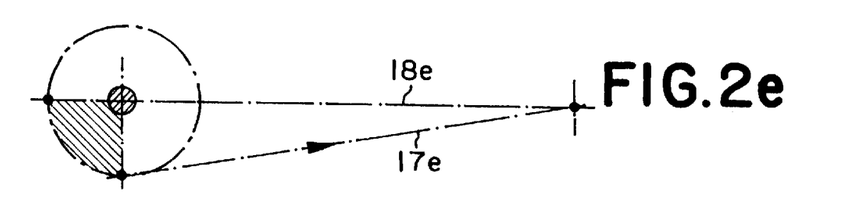
Figure 2F:
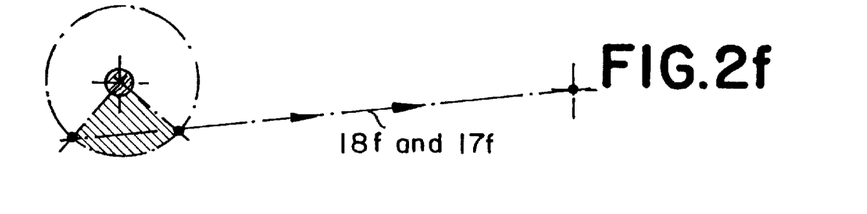

FIGS. 2a–2f illustrate the effort applied by two cylinders attached to a crankshaft through one revolution of that shaft. FIG. 2a illustrates the situation when first cylinder 17a is being pushed by high pressure hydraulic fluid (the condition of cylinder 17 shown in FIG. 1) and second cylinder 18a is on dwell, providing no effort or movement to the shaft. FIG. 2b represents the point in the cycle when both 17b and 18b are pushing on their respective piston heads 23a and 24a. FIG. 2c is the opposite of 2a, with 18c pushing and 17c on dwell or null. As the shaft rotates, FIG. 2d represents the condition when 18d is pushing while cylinder 17d is now receiving high pressure hydraulic fluid on the opposite side of the piston head (the condition of cylinder 18 shown in FIG. 1). FIG. 2e represents the next condition, where 18e is on dwell and 17e is pulling, with pressure on the rod side of its piston head. Finally, FIG. 2f illustrates the condition where both 17f and 18f are pulling, with pressure as shown for cylinder 18 of FIG. 1. This completes one revolution of the shaft to which the pistons 17, 18 are connected.

As can be seen, at all times there is positive hydraulic pressure urging at least one piston to drive the shaft, even when the other piston is at dwell or not exerting power. This not only provides for smoother power transmission, it allows for the motor to always have positive displacement when starting or stopping the motor.

Figure 3:
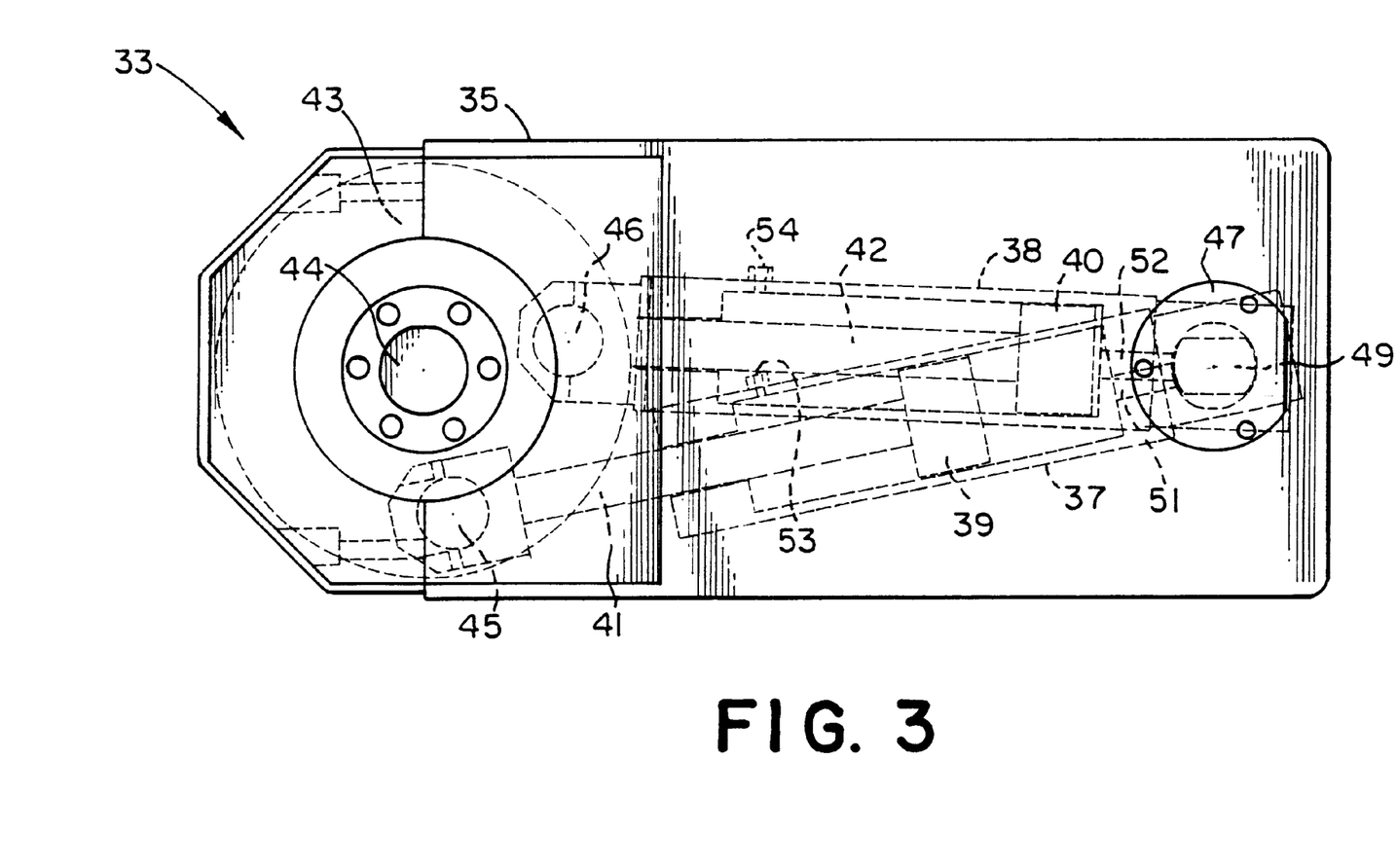
FIG. 3 is a side elevational view of the preferred embodiment of the present invention, with some moving parts shown in dotted line.

FIG. 3 illustrates the preferred embodiment of the present invention, where the motor 33 generally is enclosed in a housing 35. Cylinders 37 and 38 operate as illustrated in FIG. 2. Cylinder 37 is receiving high pressure hydraulic fluid on the top of piston head 39, driving piston rod 41 to its maximum position of extension, thereby rotating crank shaft 43 about axis 44, as piston rod 41 is attached to crank shaft 43 via crank pin 45. This corresponds to the schematic condition of cylinder 17 in FIG. 1.

FIG. 3 also illustrates the condition of cylinder 18 in FIG. 1, where cylinder 38 has high pressure hydraulic fluid on the rod side of piston head 40, thereby moving piston rod 42 to its minimum position and thus rotating crank shaft 43 about axis 44 as piston rod 42 pulls on crank shaft 43 via crank pin 46. Piston 42 is about to reach its dwell or null point, shown by 2a in FIG. 2.

Figure 4:
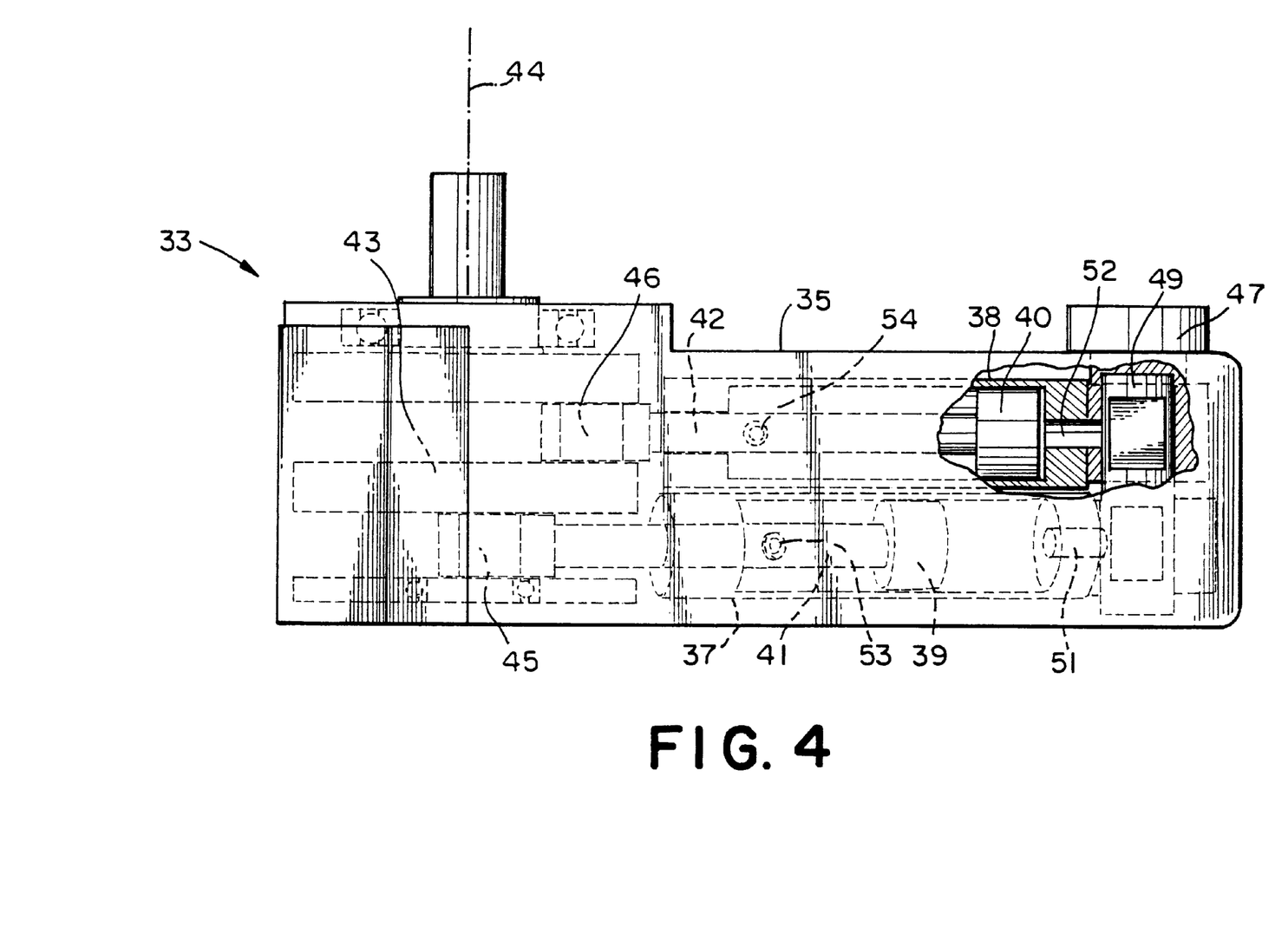
FIG. 4 is a plan view showing of the device shown in FIG. 3, again with some moving parts shown in dotted line.

FIG. 4 is a plan view of the device shown in FIG. 3, with the cylinders 37 and 38 in the same point of the motor cycle. FIG. 4 illustrates how hydraulic fluid under pressure is introduced into the cylinders via valve assembly 47. Valve assembly 47 provides for high pressure hydraulic fluid to flow along valve core 49, shown in the broken away portion, such that valve assembly 47 oscillates the same as cylinders 37 and 38 from maximum to minimum extension of rods 41 and 42. This travel is determined by the size of crank shaft 43 and the placement of points of attachment of rods 41, 42 via crank pins 45, 46 respectively.

Whatever the orientation of cylinders 37, 38, high pressure oil enters from manifold 47 along valve core 49 and communicates with one of two orifices in each cylinder 37 and 38 through valve assembly 47a as the cylinders oscillate and thus move valve assembly 47a. There is, of course, no flow when a piston is at dwell or null, as both orifices are closed during the transfer from one direction of force to the other, such as from push to pull on crank shaft 43. Cylinder 37 is extending or pushing piston rod 41 as high pressure hydraulic fluid pushes on piston head 39, flowing from valve assembly 47 along valve core 49 to first orifice 51. Low pressure hydraulic fluid is also being expelled from behind piston head 39 via second orifice 53 for return in accordance with the flow shown in FIG. 1. Cylinder 38 is retracting piston rod 42, thereby pulling crank shaft 43 via crank pin 46, as high pressure hydraulic fluid flows along core 49 to second orifice 54 as low pressure fluid is expelled via first orifice 52.

Figure 5A:
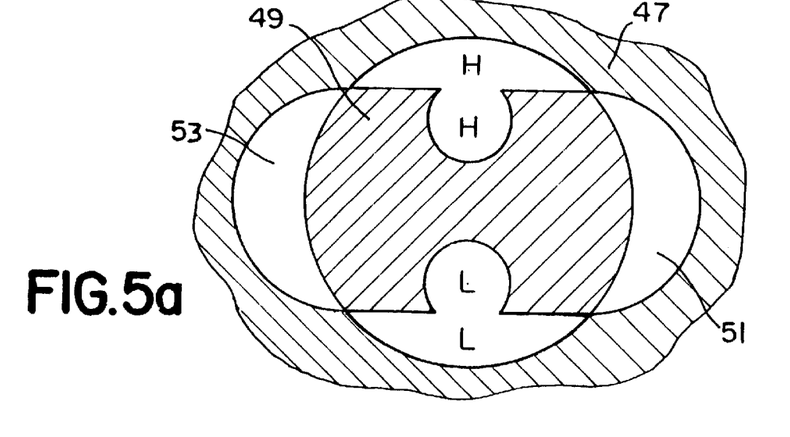
FIGS. 5a, 5b and 5c are schematic views of the valve operation of the device of FIGS. 3 and 4, showing high and low pressure fluid transfer.
Figure 5B:
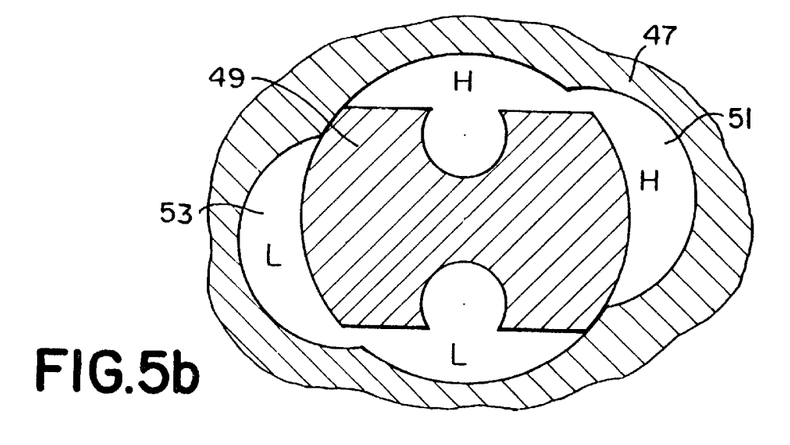
Figure 5C:
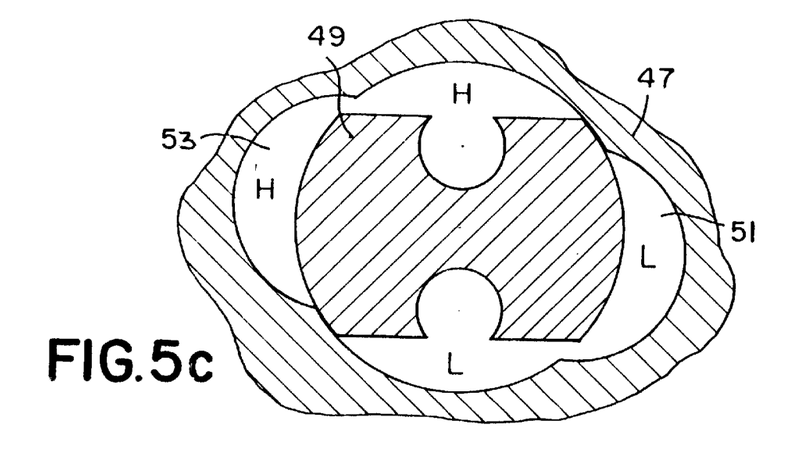

FIG. 5 illustrates the flow of hydraulic fluid about valve core 49 as it moves in valve assembly 47 to transfer high pressure fluid H to one orifice and low pressure return fluid L to the other orifice for each piston assembly. Valve assembly 47 moves with respect to valve core 49 as described above as piston heads 39 and 40 cycle between maximum and minimum positions as cylinders 37, 38 oscillate. In 5a, high pressure fluid H enters valve assembly 47 along core 49 and low pressure fluid L exits. As cylinder 37, for example, rotates, core 49 remains fixed with respect to oscillating assembly 47 in 5b to allow high pressure fluid H to enter orifice 51 and low pressure fluid L is removed from behind piston head 39 via orifice 53. Further travel past a dwell point (similar to 5a) shows in 5c high pressure fluid H entering orifice 53 and low pressure fluid L exiting orifice 51. A similar but reverse flow takes place in cylinder 38, offset by 90° for example, to provide at least one positive force at all times, as shown in FIG. 2.

Figure 6:
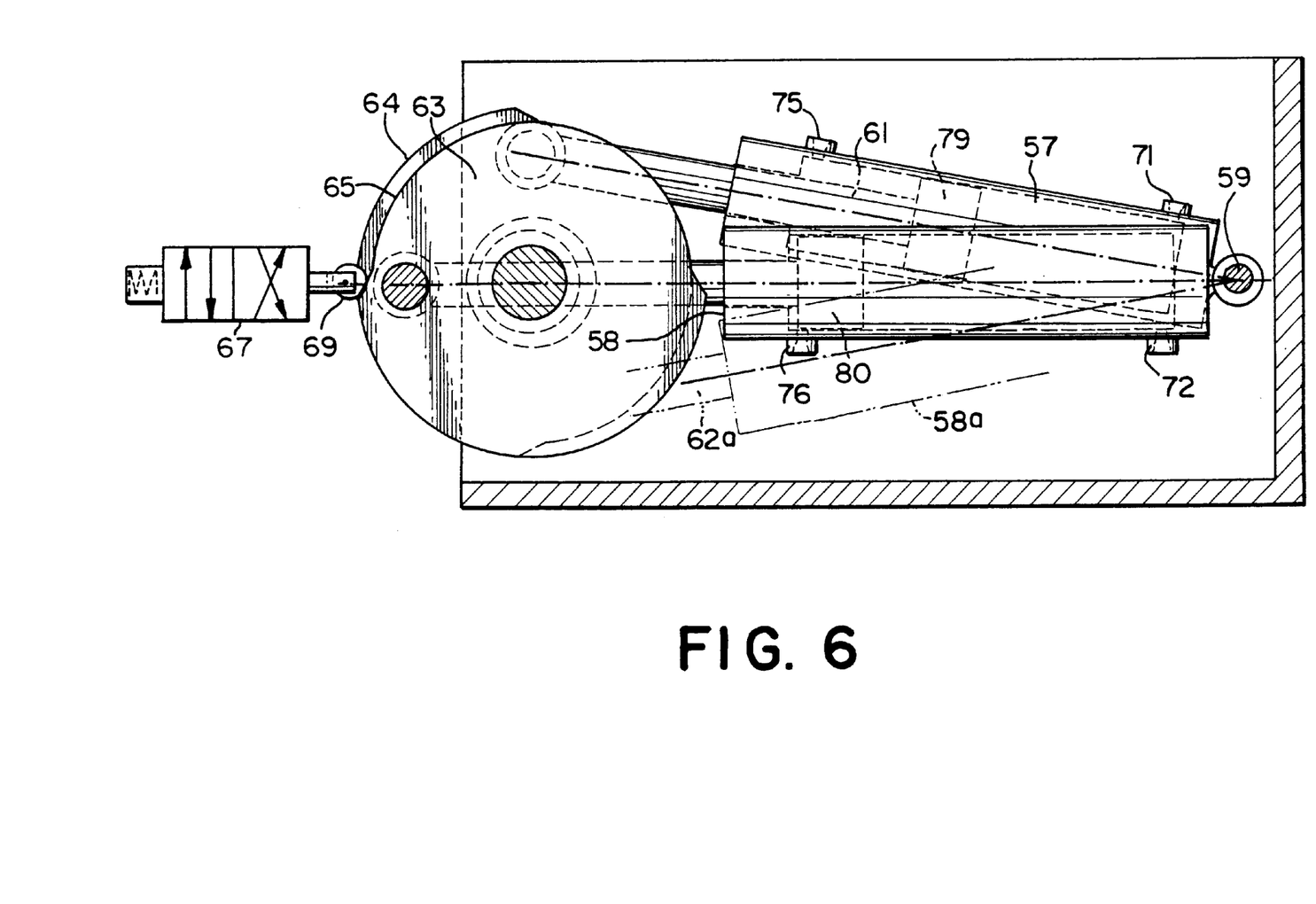
FIG. 6 is a side elevational view, partially in section, along line 6—6 of FIG. 7, showing a second embodiment of the present invention, with some moving parts shown in dotted line.
Figure 7:
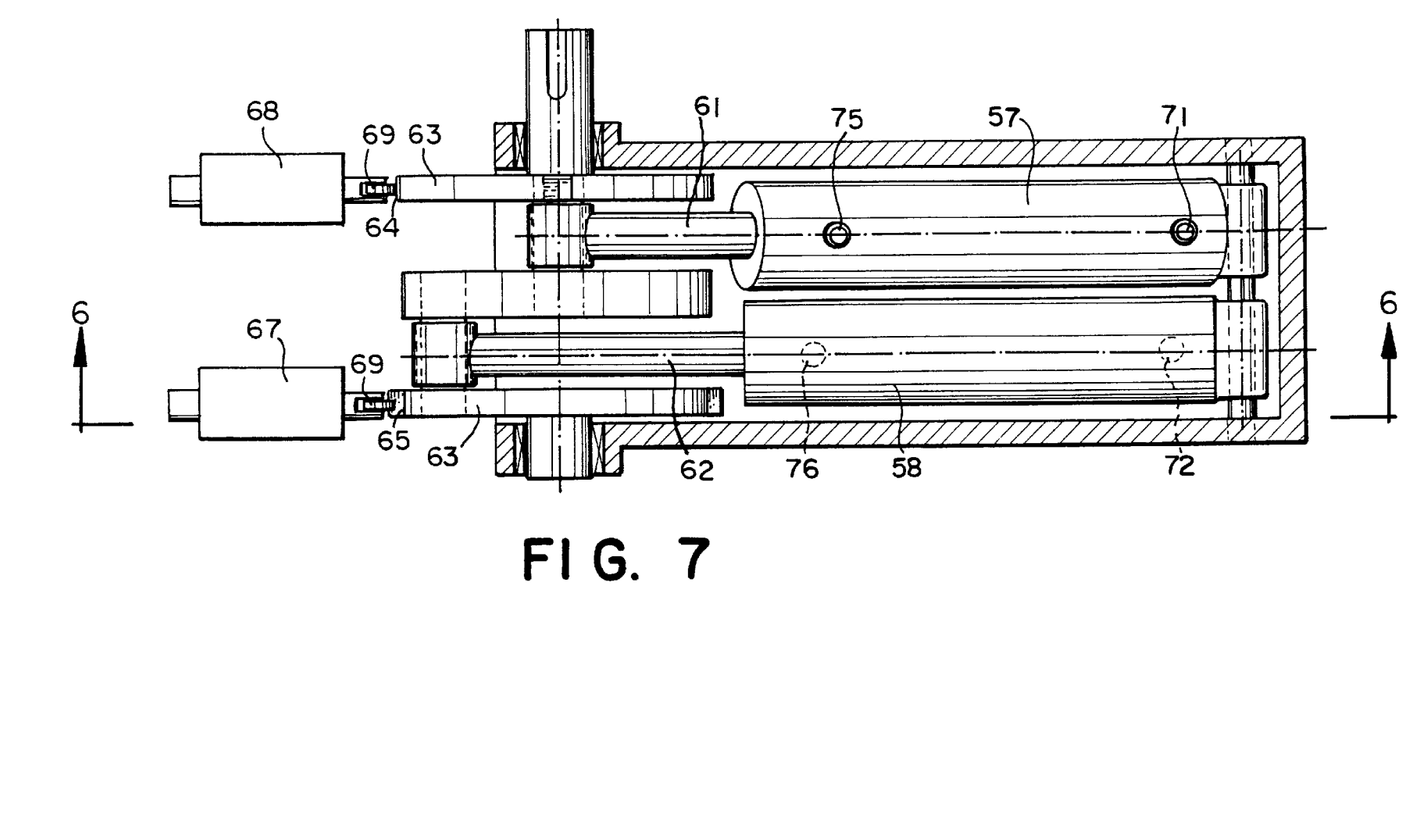
FIG. 7 is a plan view of the embodiment shown in FIG. 6, with some moving parts shown in dotted line.

In an alternative embodiment shown in FIGS. 6 and 7, hydraulic fluid flow is controlled at the opposite end from the device shown in FIGS. 4 and 5, yet the principle of operation is the same. Cylinder 57 oscillates about shaft 59 as piston rod 61 moves about crank shaft 63. Cylinder 58 also oscillates about shaft 59 as piston rod 62 also moves about crank shaft 63. For illustration purposes, one cylinder 58 is shown in the dwell location. It should be appreciated that there are only two cylinders in use. In this embodiment, crank shaft 63 includes an outer cam surface 64 and an inner surface 65, so that valves 67 engage these surfaces via spring biased roller 69. When roller 69 is on the inner surface 65, hydraulic fluid flows to port 71 to push piston head 79 and piston rod 61 toward crank shaft 63. Alternatively when roller 69 is on outer cam surface 64, hydraulic fluid flows to port 75 to move piston head 80 away from crank shaft 63 so that rod 61 pulls crank shaft 63 to cause further rotation thereof.

FIG. 7 illustrates the operation of this two piston embodiment of cylinders 57, 58 where first one and then the other piston moves its piston rod 61, 62 on the crank shaft 63 as fluid flows in or out of ports 71, 75 and 72, 76 respectively. In this embodiment as well as that of FIGS. 4 and 5, the two cylinders 57, 58 travel through the cycles illustrated in FIG. 2.

While springs and cams have replaced the valve assembly of FIGS. 4 and 5, operation is still based upon the unique and efficient principle of having hydraulic fluid act alternatively upon both faces of a piston in a cylinder, so that positive force is used to move the piston in both directions. An enormous amount of power is achieved when such motors are used as low speed/high torque hydraulic motors. A working model has been constructed that operates at 3500 psi and has a capability of generating up to 22,000 foot/pounds of torque or more.

The motors may be reversed on command, and have a braking function and may be locked solid by control of the fluid pressure flow, or they may move incrementally as desired. The housing that supports the motor should be solidly constructed to have high torsional rigidity. The unique push and pull action provides high torque, creating a large displacement motor in a compact package.

The device may be used to power a winch, rotate a reel on a reel handler, or as a wheel motor for a garden tractor, a large tractor, a boat lift and storage vehicle, a crane or lift that can be placed on a truck bed or other vehicle, and in many other industrial applications. This hydraulic motor is capable of functioning in most, if not all situations where conventional low speed/high torque hydraulic motors and the like are used, bringing the device of this invention's unique power and size advantages such as in a reel handler reel drive. While hydraulic fluids such as oil are preferred, the present invention will also function with other fluids such as water, compressible fluids such as inert gases, and the like.

The shape of the motor of this invention lends itself to applications where the output of the shaft is at the end of a beam or column, such as in a lifting boom/beam or a reel arm. In one proposed design, the wheels are at the end of stork-like legs that extend down from a platform, such that the motor mechanism is within the leg rather than in the wheel. This provides for increased strength and reliability, among other advantages.

Figure 8:
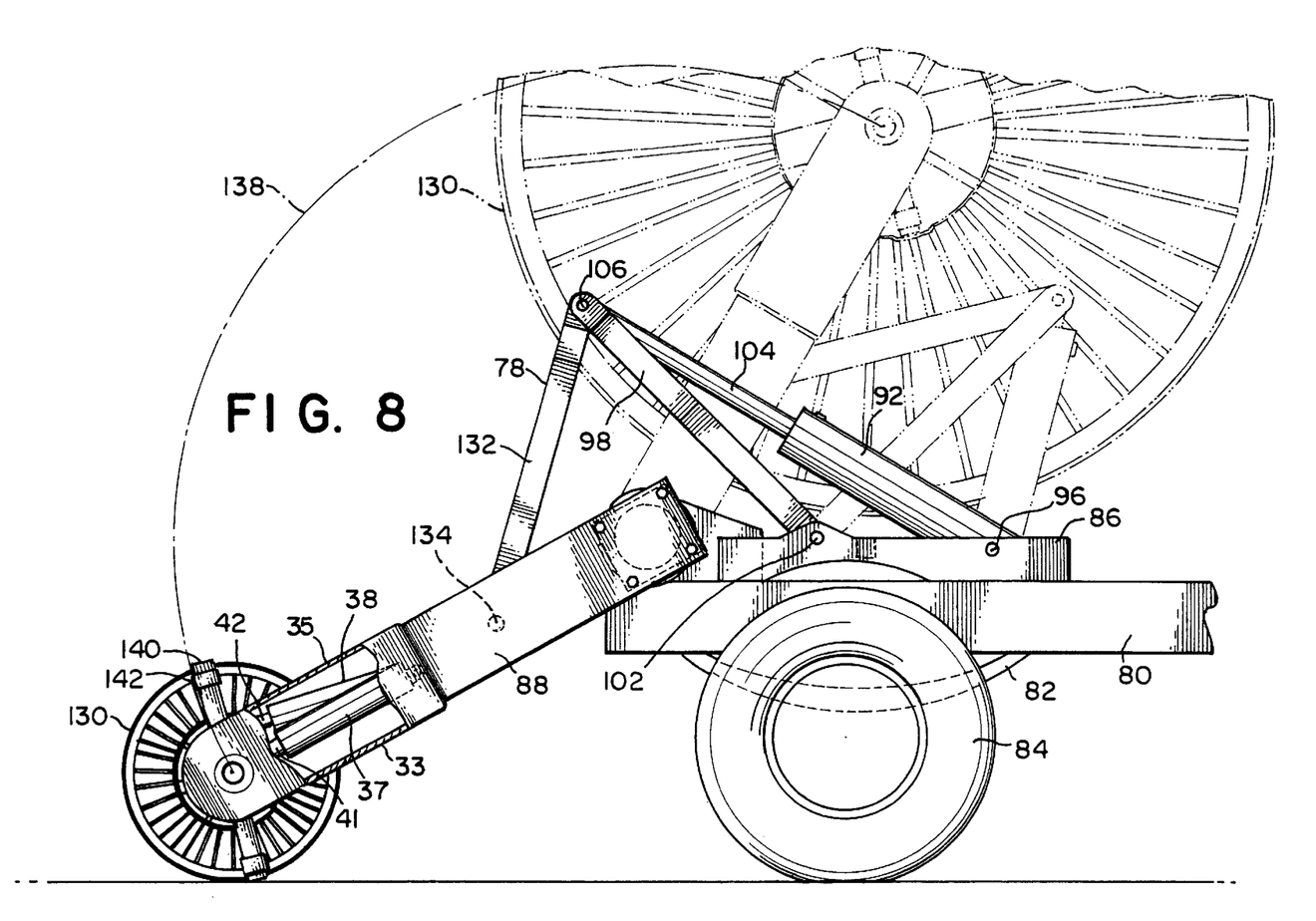
FIG. 8 is a partially cut-away, side elevational view of the preferred embodiment of the present reel handler invention, with some moving parts, and an alternate reel, shown in dotted line.

The reel handler 78 of the present invention has at least one reel arm and as shown in the drawings, the preferred embodiment has two spaced reel arms 88,90. As best shown in FIG. 8, reel handler 78 is supported by frame 86 attached to chassis 80 of a truck or trailer. Chassis has leaf springs 82 and rear wheels 84. Reel handler 78 engages reels 130 of various sizes, rotates reels 130 with at least one compact, high torque/low speed motor 33 that is contained within or forms a part reel arm 88. Motor 33 allows for the precise, powered payout and take-up of cable from reels 130. Reel handler 78 further translates engaged reels 130 from ground level to chassis level to facilitate movement and transportation of reels 130.

Figure 10:
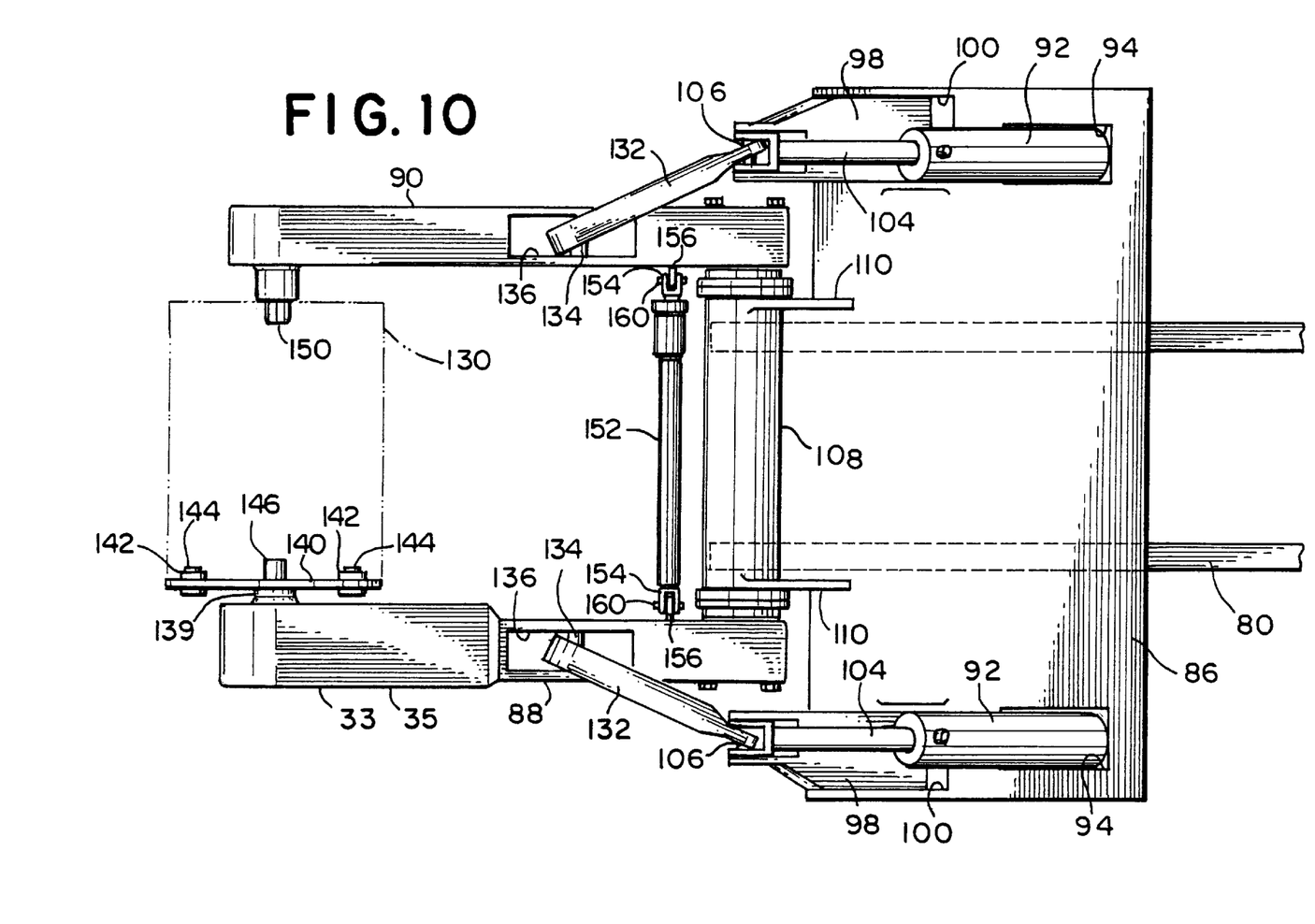
FIG. 10 is a plan view of FIG. 8 with an alternate engaged reel having a reduced width, with some of the chassis in dotted line, and showing an optional safety bar in place.

As shown in FIGS. 8 and 10 one end of lift cylinder 92 fits within frame opening 94 and is pivotally attached to frame 86 by pivot pin 96. One end of support bar 98 fits within frame opening 100, spaced rearwardly of opening 94, and is pivotally attached to frame 86 by pivot pin 102 so that lift cylinder 92 and support bar 98 swing in one common plane. Lift piston 104 extends from lift cylinder 92 and the free end of lift piston 104 is attached to the free end of support bar 98 by ball joint 106.

Figure 9:
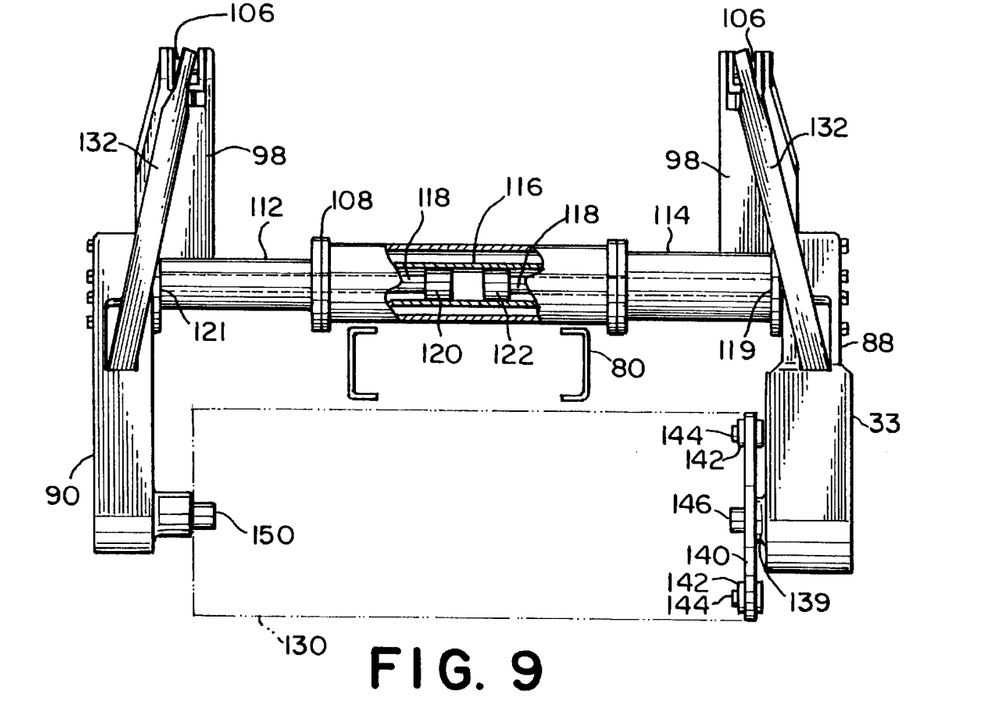
FIG. 9 is a partially cut-away, end view of the solid line view of FIG. 8, showing an engaged reel in dotted line.

Telescoping support cylinder 108 is transversely mounted at the rearward end of frame 86 and is further supported by extensions 110. Support cylinder 108 has protective, telescoping sleeves 112, 114 extending from its axial ends. Within support cylinder 108 and sleeves 112, 114, respectively, is hydraulic cylinder 116 and piston rods 118 extending from hydraulic cylinder's 116 axial ends. The distal ends of sleeves 112, 114 and piston rods 118 are operably connected to one end of reel arms 88, 90 at 119, 121, respectively. Telescoping sleeves 112, 114 protect piston rods 118, and support cylinder 108 protects hydraulic cylinder 116, from physical trauma, dirt, and debris. As shown in FIG. 9, sleeve 112 is of a slightly smaller outside diameter than the inner diameter of sleeve 114 such that sleeve 112 freely slides from and into sleeve 114 upon extension and retraction of piston rods 118, respectively.

Piston rods 118 have piston heads 120, 122 at their medial ends. Hydraulic line 124 (not shown) is operably attached proximate the middle of hydraulic cylinder 116 and hydraulic lines 126, 128 (not shown) are operably attached proximate the hydraulic cylinder's respective distal axial ends. Each line 124, 126, 128 has a valve (not shown) for controlling the flow of hydraulic fluid through the lines 124, 126, 128 to and from hydraulic cylinder 116.

Introduction of hydraulic fluid through line 124 into the center of cylinder 116 by a pump, not shown, exerts pressure against the medial surfaces of piston heads 120, 122 and drives piston rods 118 towards their maximum position of extension, pushing reel arms 88, 90 apart, when hydraulic fluid is withdrawn from cylinder 116 through lines 126, 128. Conversely, introduction of hydraulic fluid into either end of cylinder 116 through lines 126, 128 by pumps, not shown, exerts pressure against the rod side of piston heads 120, 122 and drives piston rods 118 towards their minimum position of extension, pulling reel arms 88, 90 together, when hydraulic fluid is withdrawn from cylinder 116 through center line 124.

Figure 12:
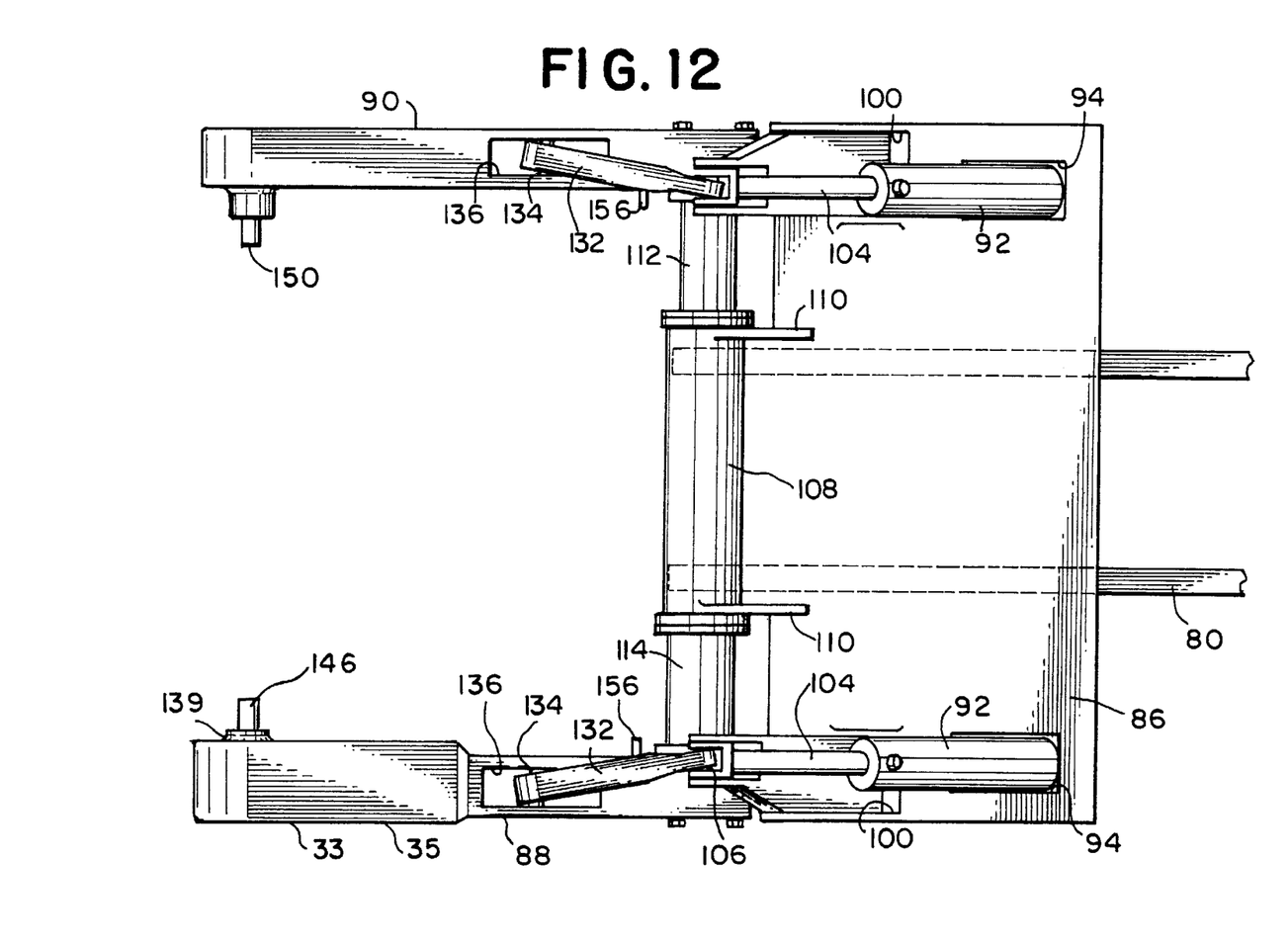
FIG. 12 similar to FIG. 10, without the safety bar in place, showing the reel arms at maximum width.

As described above, spaced, parallel reel arms 88, 90 are pivotally connected to the axial ends of support cylinder 108 via the distal ends of telescoping sleeves 112, 114 and piston rods 118. As shown in FIGS. 9, 10 and 12, and described above, extension and retraction of piston rods 118 increases and decreases, respectively, the distance between reel arms 88, 90 to facilitate engagement and disengagement of reels 130 of various sizes from reel arms 88, 90.

By manipulation of flow of hydraulic fluid to and from hydraulic cylinder 116 via lines 124, 126, 128, each reel arm 88, 90 may be moved medially or laterally either individually or in tandem. Tandem lateral movement of reel arms 88, 90 can also facilitate payout and take-up of cable from reels 130. For example, if cable is being withdrawn from a narrow pipe onto reel 130, tandem lateral movement of reel arms 88, 90 facilitates winding the cable onto reel 130 in side by side coil winds by minimizing the angle from the pipe mouth to the desired wind location on reel 130.

As best shown in FIGS. 8 and 10, one end of lift bar 132 fits within opening 136 in reel arm 88 and engages reel arm 88 by ball joint 134. The other end of lift bar 132 connects reel arm 88 to support bar 98 and lift piston 104 by ball joint 106. Retraction and extension of lift pistons 104 moves reel arm 88 to raise and lower, respectively, reel 130 from ground level, shown in solid line, to chassis level, shown in dashed line, through arc 138 of approximately 150°. The ball joint connection of reel arms 88, 90 with lift bars 132, support bars 98, and lift pistons 104 allows for the full, unimpeded range of movement of reel arms 88, 90, both laterally and vertically from ground level to chassis level as shown in FIGS. 8–10, and 12.

Hydraulic motor 33 is positioned at the free end of at least one reel arm 88, 90. Motor 33 is placed at the end of reel arm 88 such that motor housing 35 forms the distal end of reel arm 88. Reel arm 88 with motor 33 drivingly engages one axial end of reel 130 and reel arm 90 non-drivingly engages the other axial end of reel 130. Alternately, a motor 33 may form the distal end of each reel arm 88, 90, so that each reel arms 88, 90 with motors 33 drivingly engage each axial end of reel 130.

As shown in FIG. 10, hydraulic motor crank shaft 43 pierces reel arm 88 and is operably connected to a flange having a bolt ring 139. Elongated engaging bar 140 is bolted to bolt ring 139 and includes a central torque shaft 146 and slidable pin assemblies 142 at each end for driving engagement of reel 130. Pin assemblies 142 each include pin 144. Torque shaft 146 and pins 144 are directed inwardly towards reel 130. When two motorized reel arms are used, the same arrangement is made on the other side, so as to transmit torque from that second motor as well. In the present embodiment, second reel arm 90 includes central stub shaft 150 without another element for engagement of reel 130. Stub shaft 150 is directed inwardly towards reel 130. If reel arm 90 also includes a motor 33, then stub shaft 150 is replaced with a torque shaft.

Each axial end of reel 130 include a central shaft opening (not shown) and two reel openings (not shown) spaced laterally on a spoke at either side of the shaft opening. Torque shaft 146, stub shaft 150, and pins 144 are sized to snugly fit within the central shaft opening and reel openings, respectively.

To engage reel 130, reel arms 88, 90 are extended a sufficient width by the extension of pistons 118 to accommodate the width of reel 130 and are positioned proximate either axial end of reel 130. Engaging bars 140, 148 are rotated and pin assembles 142 are positioned on engaging bar 140, 148 to mirror the spacing of the reel openings at each axial end of reel 130. Pistons 118 are retracted to bring reel arms 88, 90 towards each other to seat torque shaft 146, stub shaft 150, and pins 144 in the shaft openings and reel openings, respectively, of reel 130.

Engaged reel 130 may then be raised from ground level to chassis level through arc 138 as desired to facilitate payout or take-up of cable from or to reel 130, or to transport reel 130. Motor 33 is uniquely suitable for powered rotation of reel 130 as it provides high torque, low speed rotation without the need for reducing gears. The compact design of motor 33 permits self-contained placement in the end of one or both reel arms 88, 90 in effect to form the terminus of the free ends of reel arms 88, 90.

FIG. 9 shows reels arms 88, 90 extended to engage reel 130 having maximum width while FIG. 10 shows reels arms 88, 90 extended to engage a reel 130 of minimum width. Ball joints 106, 134 allow for the full unimpeded range of extension of reel arms 88, 90 from the minimum lateral extension shown in FIG. 10 to the maximum lateral extension shown in FIG. 12 and through the full range of movement of reel arms 88, 90 and vertical movement of reel 130 from ground level to chassis level through arc 138 shown in FIG. 8.

As shown in FIG. 10, permanently mounted safety bar 152 is to be engaged once reel 130 is engaged by reel handler 78 to prevent inadvertent separation of reel arms 88, 90 and release of reel 130. This is vital during transport of reel 130 on roads and highways. Safety bar 152 can telescope to fit any spacing of reel arms 88, 90 by the extension and retraction of screw 162.

Figure 11:
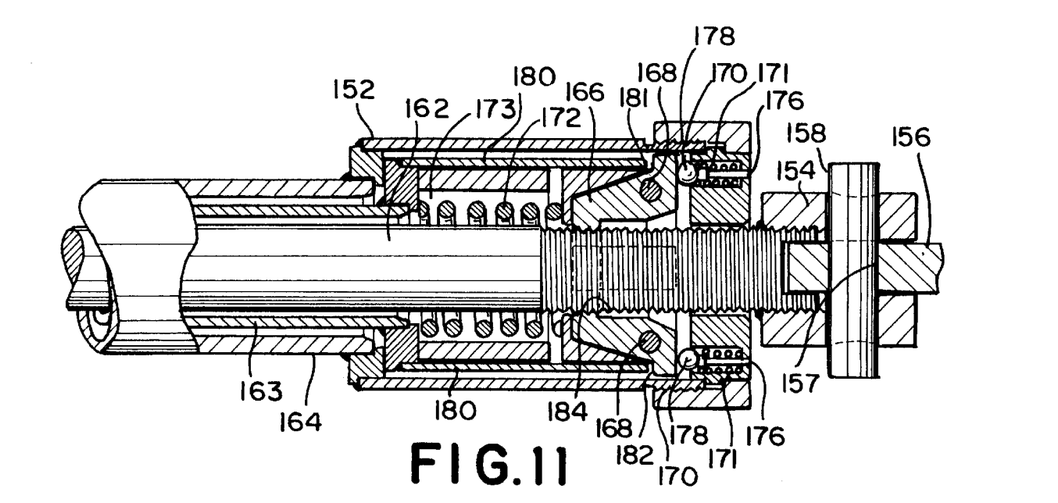
FIG. 11 is an enlarged fragmented view, partially in section, showing details of the locking and release mechanism of the safety bar shown in FIG. 10.

As shown in FIG. 11, each end of safety bar 152 has clevis 154 which fits about ear 156 on reel arms 88, 90 proximate chassis 80. Ear 156 has a hole 157 therein such that pin 158 engages clevis 154 and ear 156 to securely attach safety bar 152 to reel arms 88, 90. Cotter pin 160 may be inserted into the end of each pin 158 in standard fashion to secure each pin 158 in place.

Safety bar 152 further comprises threaded screw 162 centrally, slidably disposed within sleeve 163 which in turn is centrally, slidably disposed in outer shell 164. Four collet fingers 166, having toothed surfaces 184, are radially displaced 90° apart about screw 162 proximate clevis 154.

Toothed fingers 166 are hinged about pins 168 to engage threaded screw 162. Sleeve 163 includes push sleeve 180 axially centered about screw 162 with end 181 of push sleeve 180 proximate axially inner heel ends 182 of collet fingers 166.

When safety bar 152 is deactivated, ball bearings 170 are urged against axially outer heels ends 178 of collet fingers 166 by springs 171 to pivot collet fingers about pins 168 and engage toothed surface 184 against the threads of screw 162 to fix screw 162 in place relative to outer shell 164. This prevents telescoping of safety bar 152 and ensures an engaged reel 130 will not be inadvertently released from reel handler 78 by the separation of reel arms 88, 90. Main spring 172 is disposed within chamber 173 and urges sleeve 163 and therefore push sleeve 180 away from collet fingers 166.

To activate safety bar 152 and allow telescoping of safety bar 152, hydraulic fluid is introduced at the end of safety bar 152 opposite collet fingers 166, pushing sleeve 163 against main spring 172, compressing main spring 172 and engaging push sleeve 180 against axially inner heel ends 182 of collet fingers 166. Push sleeve 180 pushes collet fingers 166, overcoming the pressure of springs 171 urging ball bearings 170 against collet fingers 166, and pivoting collet fingers 166 about pins 168 and releasing toothed surfaces 184 from threaded screw 162 to allow cylinder 162 to freely slide within sleeve 163. When ball bearings 170 compress small springs 171, indicator rods or buttons 176 attached to ball bearings 170 emerge from the axial end of safety bar 152 to alert personnel that safety bar 152 is activated and is free to telescope.

Safety bar 152 has been designed to function up to 10,000 pounds pressure and tests conducted have shown that it can withstand 5,000 pounds of pressure without failure. To minimize corrosion, most parts of safety bar 152 are comprised of stainless steel. Collet fingers 166 are nickel plated to deter the effects of corrosion.

While particular embodiments of the present invention have been illustrated and described, it is not intended to limit the invention, except as defined by the following claims.

I claim:

1. A reel handler device for use with a reel having an axis of rotation, said device comprising:

a frame;

a pair of reel arms each having a first end for engaging a reel at one end of each of said arms along said reel axis of rotation and a second end;

first and second sleeve means for supporting said reel arms about a pivot axis for arcuately moving a reel attached to said first ends of said reel arms, said sleeve means each being attached to a respective one of said reel arms at said second ends;

lifting means mounted on said frame for mounting said reel arms on said frame and for moving said reel arms about said pivot axis to thereby raise and lower said reel;

telescoping means positioning both of said sleeve means about said pivot axis at said second end of each of said reel arms and for moving said sleeve means along an axis coincident with said pivot axis to provide for lateral movement of said reel arms in a direction parallel to the axis of rotation of said reel;

a hydraulic motor for rotating said reel, said hydraulic motor mounted in at least one of said reel arms such that the width of said device is not increased by the presence of said motor, said motor being adapted to move with said arm when said arm is moved to raise and lower said reel, said hydraulic motor comprising;

a crank shaft mounted in said reel arm and operable to rotate said reel when said crank shaft is rotated;

at least two cylinder and piston assemblies attached to said crank shaft for rotation of said crank shaft upon movement of each said piston between minimum and maximum points of travel in said cylinders to thereby impart motion to said crank shaft, said at least two cylinders being offset with respect to each other such that each piston reaches said respective maximum point of travel while the other is proximate a respective mid-point of travel; and valve means for providing hydraulic fluid to said cylinders under pressure to sequentially move each said piston between said minimum and maximum points of travel by providing hydraulic fluid under pressure on each said piston in the direction of piston travel while evacuating hydraulic fluid under lesser pressure from the other side of the piston in said cylinder.

2. The reel handler device of claim 1, wherein said at least two cylinders are offset with respect to each other by about 90° of rotation of said crank shaft such that each piston reaches a respective minimum point of travel while the other is at a respective maximum point of mechanical advantage.

3. The reel handler device of claim 2, wherein said valve means provides hydraulic fluid under pressure on one face of each of said pistons to move said pistons in the desired direction of piston travel while evacuating hydraulic fluid under lesser pressure from the opposite face of said piston in said cylinder.

4. The reel handler device of claim 1, wherein said valve means comprises:

a valve assembly for transmitting hydraulic fluid within said assemblies; and first and second orifice means on each of said cylinders for introducing high pressure hydraulic fluid from said valve assembly selectively to both faces of said pistons to impart movement thereof.

5. The reel handler device of claim 1, wherein said valve means comprises:

a valve assembly in operable relationship with said crank shaft, said crank shaft and valve assembly having cam driven valve means for directing flow of hydraulic fluid in response to the location of said cam driven valve means on said crank shaft;

first and second orifice means on each of said cylinders for introducing hydraulic fluid from said valve assembly selectively to both faces of said pistons to impart movement thereof; and means directing oil to said orifice means from said valve assembly to selectively move one of said pistons between said minimum and maximum points of travel while the other is offset from said minimum and maximum points of travel.

6. The reel handler device of claim 1, wherein said lifting means comprises:

a pair of lift cylinders pivotally attached to the frame, said lift cylinders each having a lift piston extending therefrom; and linkage means for pivotal attachment of said lift pistons to said reel arms whereby extension and retraction of said lift pistons from said lift cylinders moves said reel arms to thereby lower and raise said reel.

7. A reel handler device, comprising:

a frame;

a pair of reel arms each having a first end for engaging a reel at one end of each of said arms along said reel axis of rotation and a second end;

first and second sleeve means for supporting said reel arms about a pivot axis for arcuately moving a reel attached to said first ends of said reel arms, said sleeve means each being attached to a respective one of said reel arms at said second ends;

lifting means mounted on said frame for mounting said reel arms on said frame and for moving said reel arms about said pivot axis to thereby raise and lower said reel;

telescoping means positioning both of said sleeve means about said pivot axis at said second end of each of said reel arms and for moving said sleeve means along an axis coincident with said pivot axis to provide for lateral movement of said reel arms in a direction parallel to the axis of rotation of said reel;

a hydraulic motor for rotating said reel, said hydraulic motor mounted in at least one of said reel arms such that the width of said device is not increased by the presence of said motor, said motor being adapted to move with said arm when said arm is moved to raise and lower said reel, said hydraulic motor comprising:

a crank shaft mounted in said reel arm and operable to rotate said reel when said crank shaft is rotated;

at least two cylinder and piston assemblies attached to said crank shaft for rotation of said crank shaft upon movement of each said piston between minimum and maximum points of travel in said cylinders to thereby impart motion to said crank shaft, said at least two cylinders being offset with respect to each other by about 90° of rotation of said crank shaft such that each piston reaches said respective minimum point of travel while the other is at a respective maximum point of mechanical advantage; and valve means for providing hydraulic fluid to said cylinders under pressure to sequentially move each said piston between said minimum and maximum points of travel by providing hydraulic fluid under pressure on one face of each of said pistons to move said pistons in the desired direction of piston travel while evacuating hydraulic fluid under lesser pressure from the opposite face of said piston in said cylinder.

8. The reel handler device of claim 7, wherein said valve means comprises:

a valve assembly for transmitting hydraulic fluid within said assemblies; and first and second orifice means on each of said cylinders for introducing high pressure hydraulic fluid from said valve assembly selectively to both faces of said pistons to impart movement thereof.

9. The reel handler device of claim 8, wherein said valve assembly is in operable relationship with said crank shaft, said crank shaft and valve assembly having cam driven valve means for directing flow of hydraulic fluid in response to the location of said cam driven valve means on said crank shaft; said reel handler device further comprising:

means directing oil to said orifice means from said valve assembly to selectively move one of said pistons between said minimum and maximum points of travel while the other is offset from said minimum and maximum points of travel.

* * * * *